United States Patent [19]

Stauber

[11] Patent Number: 4,575,947
[45] Date of Patent: Mar. 18, 1986

[54] MEASURING ARM FOR A MULTIPLE COORDINATE MEASURING MACHINE

[75] Inventor: Siegfried T. Stauber, Zurich, Switzerland

[73] Assignee: Wyler AG, Switzerland

[21] Appl. No.: 587,971

[22] Filed: Mar. 9, 1984

[30] Foreign Application Priority Data

Mar. 30, 1983 [CH] Switzerland ............... 1775/83

[51] Int. Cl.[4] .................................. G01B 5/00
[52] U.S. Cl. .................... 33/561; 33/172 E; 33/558
[58] Field of Search ............ 33/174 L, 174 P, 174 R, 33/169 R, 172 E, 1 M, 23 K, DIG. 13, 553, 554, 555, 556, 557, 558, 559, 560, 561, 572

[56] References Cited

U.S. PATENT DOCUMENTS 3,869,799  11/1975  Never et al. ............. 33/174 L
3,945,124  3/1976  Jacoby et al. ............ 33/169 R

FOREIGN PATENT DOCUMENTS 1049118  8/1953  France ............... 33/DIG. 13
0150161  11/1979  Japan ............... 33/169 R
0033301  2/1982  Japan ............... 33/DIG. 13

OTHER PUBLICATIONS

Journal "Idee", 12/82, pp. 26 and 31.

Primary Examiner—Harry N. Haroian
Attorney, Agent, or Firm—Roylance, Abrams, Berdo & Goodman

[57] ABSTRACT

The measuring arm of a multiple coordinate measuring machine has two horizontal arm portions and a vertical arm part. The vertical part free end has a chuck for rigidly connecting a probe member to the measuring arm. The arm part and arm portions comprise pairs of parallel bender bars having rectangular cross-sectional configurations. A corrugated tube can surround the bars to increase the torsional stiffness of the measuring arm. Non-bendable bars freely project between each bender bar pair and carry at their free ends capacitor plate pairs forming differential capacitor primary elements. The outer electrode pairs fixed to the bender bars. Geometrical measurement with respect to the coordinate axes can be performed with two pendulums by movement of the measuring slides of the measuring machine carrying the measuring arm. The test signals of the primary elements are generated by bending movements of the measuring arm in the respective coordinate directions. A high degree of measuring accuracy and safe movement of the measuring arm are ensured since any contact with the measuring arm controls movement of the measuring machine.

16 Claims, 18 Drawing Figures

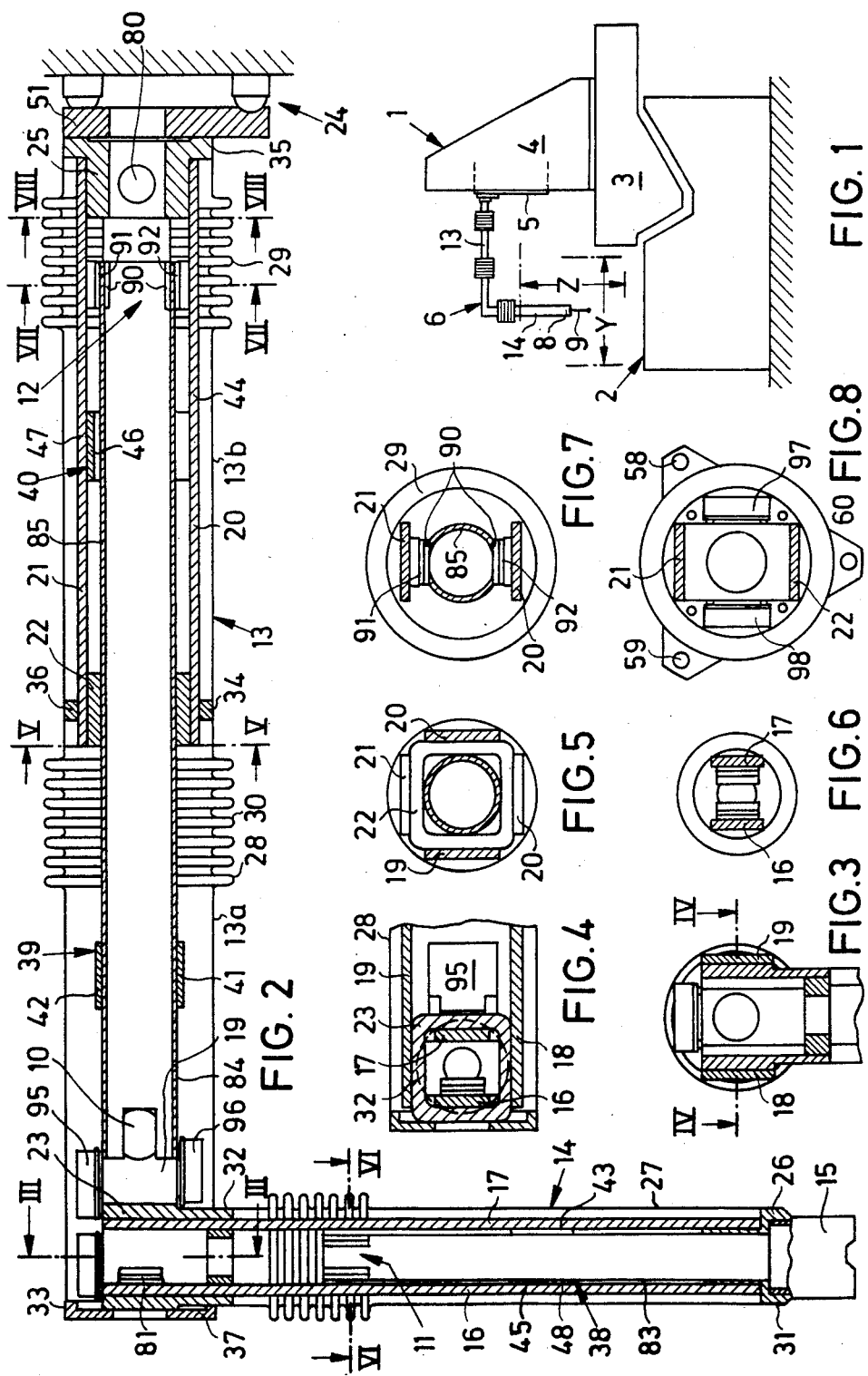

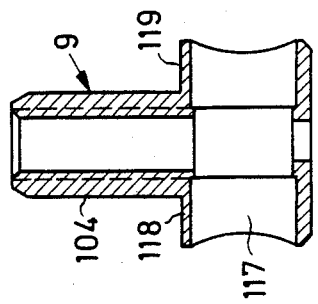
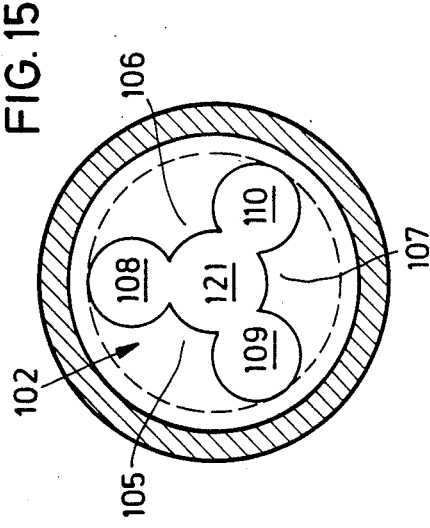
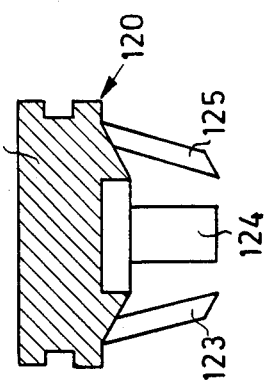
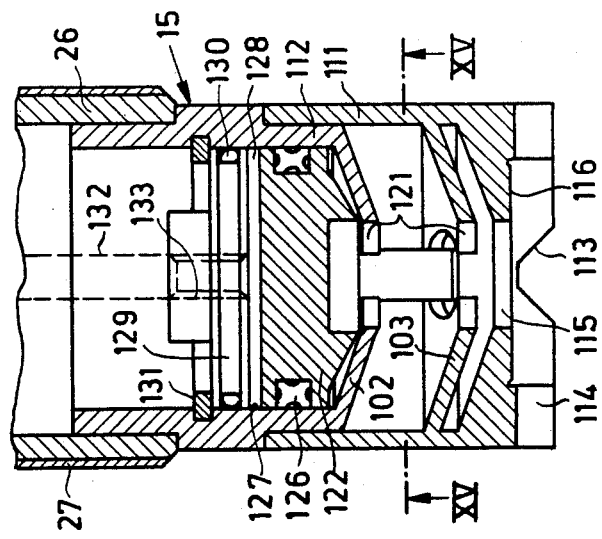

MEASURING ARM FOR A MULTIPLE COORDINATE MEASURING MACHINE

FIELD OF THE INVENTION

The present invention relates to a measuring arm for a multiple coordinate measuring machine with primary elements for measuring along different coordinates. More particularly, the present invention relates to a measuring arm carrying at least one mechanically acting probe member or sensor which is displaced relative to the point the measuring arm is fixed to the measuring machine, and having primary elements producing signals, in response to bending of the arm, forwarded to a control unit of the measuring machine through a transducer.

BACKGROUND OF THE INVENTION

A multiple coordinate measuring machine has measuring slides displaceable along the individual measuring coordinates. One of the slides carries a measuring arm projecting away from it. As a result of the measuring arm shape, a probe member or sensor fixed to the arm free end can be moved to different points on a measured object, without the measuring slide colliding with the object. The measuring arm must extend a minimum distance from the slide to provide an adequate measuring volume within which the probe member is movable.

Multiple coordinate measuring machines are marketed by a number of companies, a selection of the machines being given in the Journal "Idee", 12/82, p. 31. A partially sectioned perspective view on page 26 of this Journal illustrates a measuring arm having inductive primary elements providing displacement transducers for three coordinates in a rigid casing. The complex manufacture and high costs for constructing such measuring arm as a measuring head are apparent from the drawing. This conventional measuring arm creates a risk that the casing will collide with the object to be measured preventing measurement with the required degree of accuracy as a result of the damage to the machine. The movement of the probe member relative to the object to be measured occurs by manual remote control and requires considerable time and skill.

SUMMARY OF THE INVENTION

Objects of the present invention include providing a measuring arm for a multiple coordinate measuring system, which avoids the aforementioned disadvantages of conventional measuring arms, in that it is simply constructed, has automatic means for protecting against collisions, can be directly manually guided, and permits a relatively large measuring volume.

The foregoing objects of the present invention are basically obtained by a measuring arm for a multiple coordinate measuring machine, comprising a vertical arm part, a horizontal arm part fixedly connected to the vertical arm part and a chuck for rigidly coupling a mechanically acting probe member to a free end of one of the arm parts. First and second primary elements are mounted in the respective arm parts, spaced from the chuck, such that the primary elements react to bending movements of the arm parts along different measuring coordinates and produce signals in response to the bending movements.

By using the bending deformation of the measuring arm for measurement, numerous movably mounted precision parts, normally provided in a conventional measuring arm, are eliminated, simplifying manufacture. The bending deformations of the actual measuring arm cause the generation of test signals. The test signals lead to movement of the measuring arm or slide permitting the measuring arm to be directly and manually guided and avoiding collisions before an undesirable deformation occurs.

Unlike conventional apparatus, the probe member is not movable relative to the measuring arm for producing an inductive path or position signal. The fixed connection of the measuring arm and probe member advantageously provides a reliable, simply constructed, and easy and rapidly operable mounting support for the probe member.

The use of the bending deformation of the measuring arm also increases the measuring accuracy. The length of the measuring arm and the mounting of the primary element at a corresponding significant distance from the free arm end, i.e., from the probe member, produces a lever action and a corresponding transmission ratio for the measuring movement for increasing accuracy. The improved accuracy is evident from a comparison of the relatively short lever arm of the displacement movement in the aforementioned known measuring head.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 1 is a diagrammatic, side elevational view of a multiple coordinate measuring machine with a measuring arm according to the present invention, on a greatly reduced scale;

FIG. 2 is a side elevational view in section of a measuring arm according to the present invention;

FIG. 3 is a partial end elevational view in section of the measuring arm taken along line III—III of FIG. 2;

FIG. 4 is a partial top plan view in section of the measuring arm taken along line IV—IV of FIG. 3;

FIGS. 5 to 8 are cross-sectional views of the measuring arm of FIG. 2 taken along lines V—V, VI—VI, VII—VII and VIII—VIII, respectively;

FIG. 14 is a partial side elevational view in section of a chuck for a probe member of the measuring arm according to the present invention;

FIG. 15 is a plan view in section taken along line XV—XV of FIG. 14;

FIG. 16 is a side elevational view in section of the operating piston of the chuck of FIG. 14; and FIG. 17 is a side elevational view in section of a support for a transversely projecting probe member, which support can be inserted in the chuck of FIG. 14.

DETAILED DESCRIPTION OF PREFERRED EMBODIMENTS OF THE INVENTION

Figure 12A:
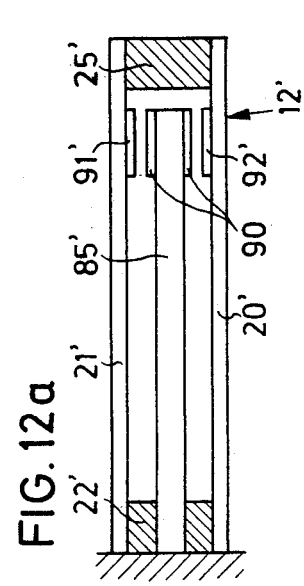
FIGS. 12a and 12b are diagrammatic representations of a primary element and its arrangement in a measuring arm in two different measuring positions.

The multiple coordinate measuring machine 1 illustrated in FIG. 1 has a fixed measuring table 2 and three measuring slides 3, 4, 5 movable in directions perpendicular to one another by servodrive mechanisms. Measuring table 2 can also be constructed as a measuring slide, if the part of the machine corresponding to slide 3 is fixed or immovable. Of significance is that measuring arm 6 of the machine is movable relative to the measuring table 2 and to an object fixed on table 2 for measuring in three directions perpendicular to one another, i.e., in the coordinate directions. By reciprocating measuring slide 4, measuring arm 6 can be horizontally displaced above measuring table 2 along axis Y. Guided movement of measuring slide 5 in measuring slide 4 vertically adjusts measuring arm 6 along axis Z. The adjustment along an X axis in the direction of the second horizontal coordinate is accomplished by relative movement between measuring slide 3 and measuring table 2.

Probe or scanning member 9 has a free end which can be moved along an upwardly directed surface of an object to be measured, and is fixed to the free end 8 of the measuring arm 6. For movement along lateral or inwardly directed surfaces of a workpiece, probe member 9 can be replaced with differently shaped alternative probe members fixed to the measuring arm. An advantageous construction of a chuck for probe member 9 is described hereinafter relative to FIGS. 14 to 16.

The free end of the probe member can be constructed as a ruby ball, and moved with a predetermined, constantly regulated compressive force or contact pressure along the surface to be measured. The movements of the measuring slide are then preferably determined by a computer with a learning mode. Primary elements are incorporated in the measuring arm for controlling the contact pressure of the probe member and serve to transmit to the computer or a numerical control unit the displacement resulting from the contact pressure of the probe for the three coordinate axes. The sensing of the object to be measured by probe member 9 can take place point-by-point or continuously, the measured or test value in each case being determined by the computer after reaching a given contact pressure.

According to the invention, primary elements 10, 11 and 12 for the three coordinate axes X, Y and Z respectively, are provided in a measuring arm 6, which arm has horizontal and vertical arm parts 13, 14. The probe member shown in FIG. 1 can be rigidly fixed by means of a chuck 15 to the free arm end. When probe member 9 is in contact with an object, the measuring arm is subjected to a slight bending movement which is sensed by the primary elements.

In order to ensure that each primary element only measures one displacement of the probe member as a result of a bending movement of the measuring arm in one coordinate axis, the measuring arm is subdivided into three portions. Each of the three portions can only be bent in one plane, i.e. in the direction of one coordinate axis. The measurement of a displacement of the probe member in the Y-axis occurs in the vertical arm part 14. The measurement of the displacement in the direction of the X and Y-axes occurs in separate portions 13a and 13b of the horizontal arm part. For this purpose, the bending movement in arm part 14 or portions 13a and 13b in each case occurs in a pair of spaced beams or bender bars 16 and 17, 18 and 19, or 20 and 21, with each bar being rectangular in transverse cross section.

The rectangular cross-sectional configurations of bender bar pairs 16 and 17, 18 and 19, and 20 and 21 extend in three planes. Each of the three planes are perpendicular to the others and parallel to one of the three coordinate axes. As illustrated in FIG. 2, the bender bars 16, 17 bend in the Y-direction, i.e. in the plane corresponding to the plane of the drawing. The bender bar pair 18, 19 or horizontal arm portion 13a bends in the X-direction, i.e. in a plane at right angles to the plane of the drawing. The bender bar pair 20, 21 bends in the Z-direction, i.e. in a plane containing the plane of the drawing, but a right angles to bender bar pair 16, 17, corresponding to an upward and downward movement of the free arm end having the chuck 15.

The adjacent longitudinal ends of the bender bar pairs of the arm are rigidly interconnected or fixed by adapters 22 and 23 as illustrated in FIGS. 4 and 5. The connection can be made with adhesive, welding and/or threaded attachments. Adapter 22 is provided in the center of the horizontal arm part. Adapter 23 is provided in the angular area of the measuring arm. Each adapter has a square, hollow cross-sectional configuration. The end of the horizontal bender bar pair 20, 21 adjacent the fixing area 24 of the measuring arm and the end of the bender bar pair 16, 17 adjacent the free arm end, are each rigidly fixed to an end piece 25 or 26. In this manner, the bender bar pairs, together with the adapters and end pieces interconnecting their ends, form parallelograms which clearly define the appropriate bending movements.

To prevent superimposing a torsional movement on the bending movement of the bender bar pairs, the adapters 22, 23 and end pieces 25, 26 are interconnected by corrugated tubes 27, 28, 29 surrounding and spaced from the bender bars. The ends of the corrugated tubes are rigidly fixed to the respective adapters and end pieces. Each corrugated tube can have corrugations 30 over its entire length or only part thereof. The corrugated tubes are torisonally stiff, but easily bendable, providing the desired torsional stiffness of the measuring arm without impeding the bending movement.

In order to rigidly connect the corrugated tubes to the adapters and end pieces, the corrugated tube ends are placed over cylindrical outer faces 31–35 of end pieces 25, 26, adapter 23 or a part 36 or 37 rigidly connected to the adapter, where they are bonded, welded and/or threadedly attached.

To prevent or dampen bending vibrations on the measuring arm, a damping member 38, 39 or 40 is provided between each bender bar pair 16 and 17, 18 and 19, 20 and 21. Each damping member is U-shaped. The free ends of the two cross-sectional legs 41, 42 are fixed at points 43, 44 to a bender bar, e.g. bars 17, 18 and 20. The web part 45, 46 of each damping member extends parallel to the other bender bar 16, 21 of a pair and at a limited distance therefrom, e.g., 0.1 to 0.2 mm. The narrow gap 47 or 48 between web part 45 or 46 and the adjacent bender bar 16 or 21 is filled by a viscous medium, e.g. lubricating grease. A bending movement of the particular bender bar pair causes a relative sliding movement between the web part and the adjacent bender bar with shear forces dampened in the viscous medium.

Only a very limited displacement of probe member 9, due to contact with the object, is necessary to make a primary element respond so that the required bending movements of the measuring arm are very small. With the construction and arrangement of the primary element described in greater detail hereinafter, measurement can be accomplished with a probe member displacement of only $10^{-5}$ mm. Due to the very limited bending movements of the measuring arm, there is no risk of permanent deformations caused by large bending movements. However, to prevent damage to the measuring arm by unacceptable forces, such as impact forces in the case of impact, the fixing device attaching the measuring arm to coordinate measuring machine 1 can be disengaged when a predetermined force on the measuring arm is exceeded. The fixing device can be constructed such that a disengagement occurs when probe member displacement exceeds 1 mm.

Figure 10:
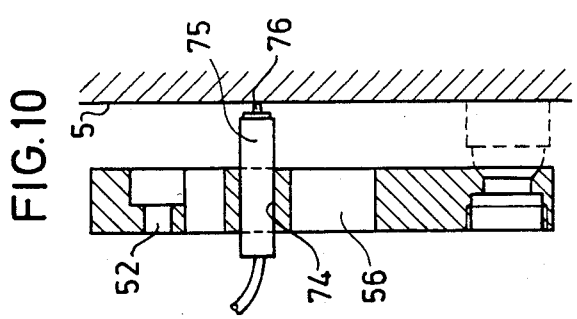
FIG. 10 is a side elevational view in section taken along line X—X of FIG. 9, illustrating a contact switch and part of the measuring machine.
Figure 9:
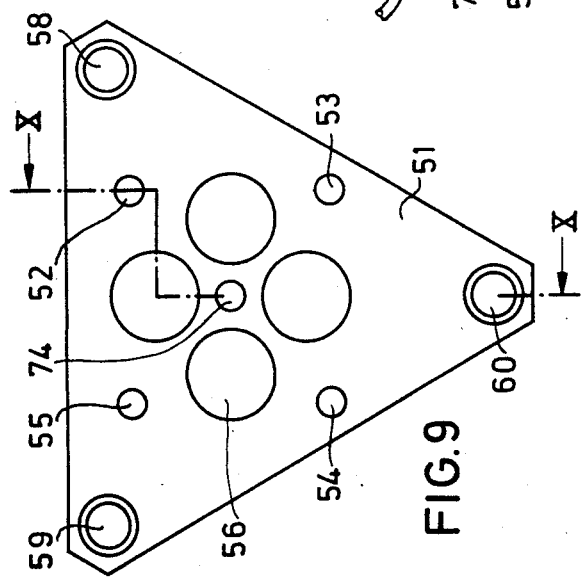
FIG. 9 is a plan view of a fixing flange for the measuring arm of FIG. 2.
Figure 11:
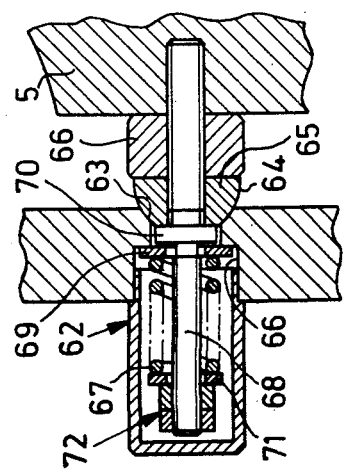
FIG. 11 is an enlarged partial side elevational view of the fixing point of the flange of FIGS. 9 and 10.

One embodiment of such fixing device, illustrated in FIGS. 9 to 11, comprises a fixing device or flange 51 rigidly connected to end piece 25 of the measuring arm by screws. The screws pass through countersunk holes 52-55 in the flange. One of the larger bores 56, symmetrically located about the center of the flange, provides a passage for the cable connecting the individual primary elements and the electronic control unit of the measuring machine.

The three corners of flange 51 have bores 58, 59 60 with one bore shown in cross section in FIG. 11. These bores receive release mechanism 62, illustrated in FIG. 11. In this release mechanism, a spherical seat 63 of bore 60 is pressed elastically or resiliently against a correspondingly shaped spherical surface 64 on a support member 65. Support member 65 is supported by a spacer 66 on measuring slide 5 of measuring machine 1. The elastic pressure or resiliency is provided by a helical spring 67 surrounding a bolt 68 and supported on one end by a shim 69 on a collar 70 of the bolt and on the other end by a shim 71 on a lock nut pair 72 threaded onto the bolt. Bolt 68 extends through flange bore 60, support member 65 and spacer 66, and is screwed to the measuring slide 5 so that, together with the two other bolts extending through flange bores 58 and 59, it supports the measuring arm. Bolt 68 is screwed in until its collar 70 presses support member 65 with spherical surface 64 and the spacer 66 as a rigid unit against the outside of measuring slide 5.

If a force exceeding a predetermined quantity acts on the measuring arm, and consequently on fixing flange 51, the flange or its seats 63 in bores 58, 59, 60 are raised from the spherical surfaces 64 of support members 65, because the adjustable force or tension of springs 67 are exceeded. In this manner, excessive or impact forces are absorbed by springs 67 of the release mechanism 62.

The release or raising of a seat 63 from a support member 65 operates a contact switch 75 fixed in a flange bore 74 (FIG. 10). Switch 75 supplies the measuring machine with a stop signal for stopping the measuring movement. Contact pin 76 of contact switch 75 is a precision switch, rests on the surface of measuring slide 5, and produces a switching signal even upon the most minor raising movement of the spherical seat 63.

In addition to the three primary elements 10, 11 and 12, measuring arm 6 of measuring machine 1 can be provided with two electronic pendulums 80, 81. The electronic pendulums supply signals to the control unit of measuring machine 1 indicating divergences from the proper alignment of the measuring arm from the geometrical axes. The completely enclosed pendulums 80 and 81 are fixed, in two vertically and perpendicularly oriented planes to the opposite ends of the horizontal arm part 13 of measuring arm 6. One pendulum 80 responds to a displacement in the X-direction, while the other pendulum 81 responds to a displacement in the Y-direction. This permits geometrical measurement of measuring machine 1 along all three coordinate axes, in that the measuring slides 2, 3, 4 of the machine are moved over their full movement distance.

The resulting pendulum signals are processed to a precise geometrical determination by the computer of measuring machine 1. By storing the results, the measuring machine can correct for the divergences from the coordinate axes during object measurement resulting from imprecise alignment or non-linear guideways in the measuring slides. Pendulum 80 permits a geometrical determination in the Z and X directions, while pendulum 81 permits a geometrical determination in the Z and Y directions during the vertical movement of measuring slide 5. The construction and electronic circuitry of pendulums 80, 81 can be in accordance with the device described in German Pat. No. 2,523,446 (corresponding U.S. Pat. No. 4,023,413 of the same Applicant, the disclosure of which is hereby incorporated reference). The electronic circuitry can also be constructed in the same way employed for primary elements 10-12, as described hereinafter relative to FIG. 13.

Figure 12B:
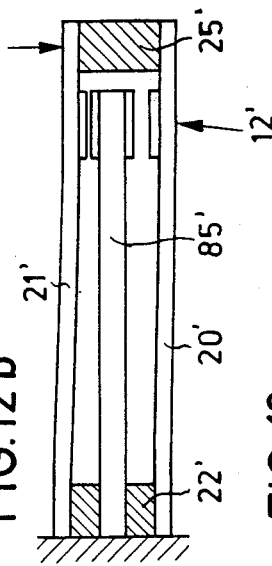

The preferred form of primary elements 10-12 is diagrammatically shown in FIGS. 12a and 12b. A pair of bender bars 20' and 21', based on the construction within arm portion 13b of FIG. 2, and generally corresponds to any one of the bender bar pairs 16 and 17, 18 and 19, 20 and 21 according to FIG. 2. The two ends of bender bars 20' and 21' are rigidly connected to an adapter or end piece 22', 25' to form a parallelogram. A freely projecting bending-stiff or nonbendable bar 85' is also rigidly fixed to one end of the arrangement, i.e., to adapter 22'. As bar 85' projects freely, no mechanical forces act on its projecting region. Bar 85' extends longitudinally of the represented arrangement, i.e., in the longitudinal direction of the measuring arm and parallel to bender bars 20' and 21'. When bending forces act on bender bars 20' and 21', a spacing change occurs between bar 85' and the bender bars 20' and 21'. The spacing change is greatest at the free end of bar 85'. To utilize the maximum spacing change for measurement of the bending movements of the bender bars or of the measuring arm, a primary element 12' is fitted in the vicinity of such free end of bar 85', and very accurately responds to a spacing change between the end of the bar 85' and the bender bars 20' and 21'.

Different types of primary elements can be used. Preferably, a capacitive primary element and its corresponding electrical circuitry are used in accordance with FIG. 13. The construction of the primary element 12', or of the primary elements 10-12, is in accordance with the teachings of German Pat. No. 2,523,446, corresponding to U.S. Pat. No. 4,023,413.

Measuring is based on the change in the capacitance between capacitor plate 90 and the electrode plates 91, 92, arranged parallel thereto, when a spacing change occurs between the plates. Capacitor plate 90, according to FIG. 13, corresponds to a capacitor plate pair 90 fixed to the free end of bar 85'. Electrode plates 91, 92 are fixed to the inside of bender bars 20', 21' facing the capacitor plate pair 90. FIGS. 12a and 12b are diagrammatic, and the distance between the capacitor plates and the electrode plates is much smaller in actual practice than that illustrated.

The two electrode plates 91, 92 are connected to a generator 93 for generating an a.c. voltage, $U_o$, so that voltages of the same amplitude and frequency, but phase-displaced by 180°, are applied to electrode plates 91, 92. The voltages acting on the capacitor plate 90 cancel one another out if it is precisely positioned between electrode plates 91, 92. If there is a spacing change between the capacitor plate 90 and the electrode plates, an a.c. voltage $U_L$ is produced as a result of the change in the capacitances between the electrode plates and the capacitor plate. Capacitor plate 90 is electrically connected to a transducer 94, in which the a.c. voltage $U_L$ is converted into a test signal S supplied to the computer of the measuring machine.

The electronic auxiliary devices directly connected to capacitor plate pair 90 and to electrode plate pair 91, can be housed in prints 95, 96, 97 including an amplifier. The prints, in the vicinity of the respective primary elements in the measuring arm, are fixed at the points shown in FIGS. 2, 4 and 8.

Figure 13:
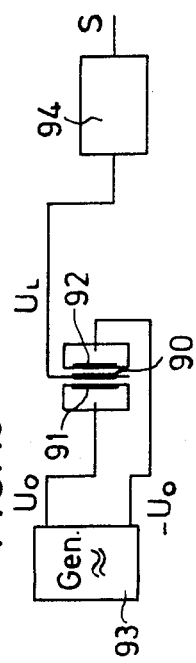
FIG. 13 is an electrical circuit diagram for the primary element.

As stated hereinbefore, pendulums 80, 81 can have the same electronic circuitry illustrated in FIG. 13. An amplifier print 98 associated with pendulum 80 is diagrammatically shown in FIG. 8.

The bending-stiff or non-bendable bars 83, 84, 85 of arm part 14 and arm portions 13a, 13b are constructed as tubes in the illustrated embodiment. The free end of each tube is flattened to support the capacitor plate pair 90, 91. The manufacture of bars 83, 84, 85 with circular cross sections provides bars having particularly good dimensional stability. Such bars can also be particularly easily manufactured with a high degree of accuracy, particularly if wound from carbon fibers. The material used for the bar must not change shape when subjected to temperature changes. The remaining parts, such as the cross-sectionally rectangular bending bars, are preferably also made from carbon fibers or Invar steel to prevent temperature changes from influencing measuring accuracy.

The bending-stiff bars 84, 85 of arm portions 13a, 13b are preferably formed from a common tube in accordance with FIG. 2. Such common tube has a central area rigidly connected to adapter 22, which adapter also forms the connection between the differently arranged bender bar pairs 18 and 19, and 20 and 21.

The above description of the measuring arm according to the present invention clearly shows that a force acting directly at any point on the measuring arm and at a distance from fixing flange 51 is transferred via adapters 23, 22 or end piece 26 to the bender bars, and consequently to the primary elements. The primary elements generate corresponding signals which are supplied to the numerical control unit of the measuring machine such that measuring slides 3 to 5 can perform a corresponding deflection movement. A measuring arm according to the invention can also be manually guided directly so that the probe member 9 moves along a desired spatial path and a corresponding movement program is fed into the multiple coordinate measuring machine computer. With conventional machines, the drives of the measuring slides 3 to 5 had to be manually controlled from a console for this purpose.

A chuck 15, shown in FIGS. 14-16, is connected to the rigid end piece 26 of measuring arm 6. The chuck diameter can approximately correspond to the diameter of vertical arm part 14, which is, e.g., 50 mm. Chuck 15 can be pneumatically and remotely controlled for grasping or releasing a probe member 9. The probe member is kept in reserve at a particular point on the edge of the measuring table. The movement control of the measuring machine moves the chuck at this point as a result of the fed-in movement program. In this manner, the measuring arm can automatically obtain a suitable probe member 9 for performing different measurements.

Chuck 15 has two cup springs 102, 103 shaped in accordance with FIG. 15 and successively following one another in the direction of the measuring arm or the chuck axis. For grasping the shaft 104 of a probe member or its holder 9' (FIG. 17) at three peripheral points, each cup spring 102, 103 has three gripping tabs 105, 106, 107. The free ends of the tabs are adapted to the shape of a probe member shaft 104 and are consequently arcuate. The gripping tabs are formed by three circular recesses 108, 109, 110 arranged at the same angle relative to one another.

The cup springs 102, 103 form part of circular cylindrical casing parts 111 and 112. When cylindrical portions of such casing parts are slid over one another, their cup springs are precisely centered or axially aligned relative to one another. This centers inner casing part 112 relative to end piece 26 of measuring arm 6. At the free end of the outer cylindrical casing part 111, prismatic stop faces 113, 114 which are perpendicular to each other, and planar stop face 116 concentric to the chuck insertion opening 115 are provided. These stop faces 113, 114, 116 precisely align a probe member 9 or holder 9'.

The axially acting spring tension of cup springs 102, 103 causes a reference surface provided on the probe member or holder to be drawn against at least one stop face. Horizontally directed probe members have a cylindrical shaft which can engage prismatic face 113 or 114 and can be drawn against stop face 116 by the holder shown in FIG. 17. Such horizontal probe member is placed through a transverse bore 117 of a cylindrical holding part 118 projecting from both sides of shaft 104. Shaft 104 of holder 9', according to FIG. 17, is precisely grasped by the two cup springs 102, 103. The reference surface of a vertical probe member comprises a shoulder face, which corresponds to face 119 of cylindrical part 118 in FIG. 17 and projects radially from the shaft 104. The shaft is grasped by the cup springs 102, 103.

The shaft 104 of a probe member or holder is secured by the resiliency of cup springs 102, 103. The cup springs are bend outwardly by a compressed air-operated piston 120 such that their central gripping opening 125 is widened to grip a shaft. Upper cup spring 102 is bent by piston member 122 (FIG. 16), while lower cup spring 103 is bent by fingers 123, 124, 125 provided on the piston and sloping with relative to its axis. The fingers extend through recesses 108, 109, 110 in upper cup spring 102.

Piston 120 is sealed relative to the inner wall 127 of the cylindrical cup part 112 by a piston packing 126. The cylindrical space 128 in cylindrical chuck part 112 is upwardly sealed by a cover 129 with a seal 130, held in position by a spring washer 131 inserted in a slot. Compressed air for moving piston 120 is supplied by hose 132 indicated by dotted lines, which hose has an end nipple screwed into a threaded bore 133 of cover 129. This hose 132 can be passed through the inner area of arm parts 13, 14.

While various embodiments have been chosen to illustrate the invention, it will be understood by those skilled in the art that various changes and modifications can be made therein without departing from the scope of the invention as defined in the appended claims.

What is claimed is:

1. A measuring arm for a multiple coordinate measuring machine, comprising:
   a vertical arm part;
   a horizontal arm part fixedly connected to said vertical arm part, said horizontal arm part including first and second horizontal arm portions arranged end to end and being bendable in only first and second planes, respectively, said first and second planes being perpendicular;
   chuck means for rigidly coupling a mechanically acting probe member to a free end of one of said arm parts; and
   first and second primary elements, with sensor means for producing signals, mounted in said vertical and horizontal arm parts, respectively, and spaced from said chuck means such that said primary elements react to bending movements of said arm parts along different measuring coordinates and said sensor means produce signals in response to said bending movements;
   whereby bending of said horizontal arm portions causes said primary elements and sensor means to produce signals corresponding to X and Z axes, respectively.

2. A measuring arm according to claim 1 wherein each of said arm parts comprise parallel bender bars having rectangular cross-sectional configurations and opposite first and second ends; said horizontal arm part and said vertical arm part are coupled by a first adapter; said horizontal arm portions are coupled by a second adapter; end pieces are coupled to free ends of said arm parts; said bender bars ends are rigidly coupled to said adapters and end pieces; and said bender bars of adjacent arm parts and portions having longer dimensions of said rectangular cross-sectional configurations oriented perpendicularly.

3. A measuring bar according to claim 2 wherein said bender bars are surrounded by tubes having corrugated portions and tube ends rigidly connected to said adapters and said end pieces such that said arm parts are torsionally stiff.

4. A measuring arm according to claim 3 wherein a first stiff beam is mounted within said vertical arm part and rigidly coupled to said end piece thereof; second and third stiff beams are mounted in said first and second horizontal arm portions, respectively, and are fixed coupled to said second adapter; each of primary elements comprises a first member mounted on a free end of one of said stiff beams and a second member on at least one of said bender bars adjacent thereto such that said bending movements change the spacing of said first and second members to generate a signal corresponding to the changed spacing.

5. A measuring arm according to claim 2 wherein a first stiff beam is mounted with said vertical arm part and rigidly coupled to said end piece thereof; second and third stiff beams are mounted in said first and second horizontal arm portions, respectively, and are fixed coupled to said second adapter; each of primary elements comprises a first member mounted on a free end of one of said stiff beams and a second member on at least one of said bender bars adjacent thereto such that said bending movements change the spacing of said first and second members to generate a signal corresponding to the changed spacing.

6. A measuring arm according to claim 5 wherein each of said primary elements comprises a differential capacitor having an outside electrode pair mounted on inner surfaces on adjacent pair of said bender bars, and having at least one capacitor plate enclosed between said electrode pair and fixed to a free end of said stiff beam extending between said adjacent pair of bender bars.

7. A measuring arm according to claim 2 wherein each of said vertical arm part and said horizontal arm portions comprise dampening means, extending parallel to and between bender arms thereof for dampening mechanical bending vibrations.

8. A measuring arm according to claim 7 wherein each said dampening means comprises a first member fixed to one of said bender bars.

9. A measuring arm for a multiple coordinate measuring machine, comprising:
   a vertical arm part;
   a horizontal arm part fixedly connected to said vertical arm part;
   alignment means, included in said arm parts, for aligning said arm parts relative to coordinate axes, said alignment means comprising first and second electronic pendulums, said first electronic pendulum being at right angles to said second pendulum;
   chuck means for rigidly coupling a mechanically acting probe member to a free end of one of said arm parts; and
   first and second primary elements, with sensor means for producing signals, mounted in said vertical and horizontal arm parts, respectively, and spaced from said chuck means such that said primary elements react to bending movements of said arm parts along different measuring coordinates and said sensor means produce signals in response to said bending movements.

10. A measuring arm for a multiple coordinate measuring machine, comprising:
    a vertical arm part;
    a horizontal arm part fixedly connected to said vertical arm part;
    chuck means for rigidly coupling a mechanically acting probe member to a free end of one of said arm parts;
    first and second primary elements, with sensor means for producing signals, mounted in said vertical and horizontal arm parts, respectively, and spaced from said chuck means such that said primary elements react to bending movements of said arm parts along different measuring coordinates and said sensor means produce signals in response to said bending movements; and
    connecting means for attaching said arm parts to a meauring machine including a release mechanism biased by a spring member and a contact switch, said spring member being deformed and said contact switch generating a signal when a predetermined force on said arm parts is exceeded.

11. A measuring arm for a multiple coordinate measuring machine, comprising:

a vertical arm part;

a horizontal arm part fixedly connected to said vertical arm part;

chuck means for rigidly coupling a mechanically acting probe member to a free end of one of said arm parts, said chuck means being pneumatically operated; and first and second primary elements, with sensor means for producing signals, mounted in said vertical and horizontal arm parts, respectively, and spaced from said chuck means such that said primary elements react to bending movements of said arm parts along different measuring coordinates and said sensor means produce signals in response to said bending movements.

12. A measuring arm according to claim 11 wherein said chuck means includes clamping members comprising portions of a cup spring, and pneumatic piston means for bending said portions of said cup spring.

13. A measuring arm according to claim 11 wherein said chuck means is mounted coaxially on said vertical arm part, and includes clamping members comprising two successively arranged cup springs and pneumatic piston means for bending portions of said cup springs.

14. A measuring arm according to claim 13 wherein said chuck means comprises at least one stop face for contacting and orienting the probe member, and develops a clamping force which draws the probe member against said stop face.

15. A measuring arm according to claim 12 wherein said chuck means comprises at least one stop face for contacting and orienting the probe member, and develops a clamping force which draws the probe member against said stop face.

16. A measuring arm according to claim 11 wherein said chuck means comprises at least one stop face for contacting and orienting the probe member, and develops a clamping force which draws the probe member against said stop face.

* * * * *